US010620815B2

United States Patent
Gil

(10) Patent No.: US 10,620,815 B2
(45) Date of Patent: Apr. 14, 2020

(54) CONTINUED SELECTION DURING SCROLLING PAST SCREEN EDGE THRESHOLDS

(71) Applicant: Microsoft Technology Licensing, LLC, Redmond, WA (US)

(72) Inventor: Erez Kikin Gil, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 112 days.

(21) Appl. No.: 15/486,127

(22) Filed: Apr. 12, 2017

(65) Prior Publication Data

US 2018/0300032 A1 Oct. 18, 2018

(51) Int. Cl.
*G06F 9/48* (2006.01)
*G06F 3/0485* (2013.01)
*G06F 1/16* (2006.01)
*G06F 3/0488* (2013.01)
*G06F 3/0482* (2013.01)

(52) U.S. Cl.
CPC .......... *G06F 3/0485* (2013.01); *G06F 1/1626* (2013.01); *G06F 3/0482* (2013.01); *G06F 3/0488* (2013.01)

(58) Field of Classification Search
CPC .... G06F 3/0485; G06F 3/0482; G06F 1/1626; G06F 3/0488
See application file for complete search history.

(56) References Cited

U.S. PATENT DOCUMENTS

| | | | |
|---|---|---|---|
| 8,314,809 B1 | 11/2012 | Grabowski et al. | |
| 9,454,290 B1 | 9/2016 | Ma et al. | |
| 2005/0005248 A1 | 1/2005 | Rockey et al. | |
| 2008/0168386 A1 | 7/2008 | Brinda et al. | |
| 2010/0058240 A1 | 3/2010 | Bull et al. | |
| 2010/0281374 A1* | 11/2010 | Schulz | G06F 3/0482 715/723 |

(Continued)

OTHER PUBLICATIONS

Jacob Greenleaf, "Scroll Selection", Aug. 11, 2013 [online], [retrieved on Sep. 22, 2018]. Retrieved from the Internet: <URL:https://web.archive.org/web/20160428161515/https://codepen.io/jacobgreenleaf/pen/HuhAm>, 4 pages. (Year: 2013).*

(Continued)

*Primary Examiner* — Jennifer N To
*Assistant Examiner* — Kc Chen
(74) *Attorney, Agent, or Firm* — Jeffrey L. Ranck; Ranck IP Law

(57) ABSTRACT

Representative embodiments disclose mechanisms for machine interfaces. The system comprises a screen with one or more viewports. A scrollable list is displayed in one of the viewports. Scrolling may be vertical (up/down), horizontal (left/right) or both (diagonal). The system receives selection of an item in the list. As the list is scrolled, the system monitors the position of the selected item relative to the edges of the viewport. When the item comes within a threshold distance of the edges of the viewport, the system changes the selection from the currently selected item to another item within the viewport. As the selection is changed, the context remains consistent, thus context sensitive toolbars remain in the same context as items are scrolled off the screen and new items are selected.

20 Claims, 7 Drawing Sheets

(56) References Cited

U.S. PATENT DOCUMENTS

| | | | | |
|---|---|---|---|---|
| 2010/0325533 | A1* | 12/2010 | Artz | G06F 17/30905 |
| | | | | 715/235 |
| 2013/0080957 | A1 | 3/2013 | Sirpal et al. | |
| 2013/0159834 | A1 | 6/2013 | Johnson et al. | |
| 2014/0195965 | A1 | 7/2014 | Brunet et al. | |
| 2015/0378600 | A1 | 12/2015 | Sloan et al. | |
| 2016/0132567 | A1 | 5/2016 | Dole et al. | |
| 2016/0170576 | A1* | 6/2016 | Brown | G06F 3/0482 |
| | | | | 715/784 |

OTHER PUBLICATIONS

"DataGrid Keep Selected Item in the ScrollView", https://www.codeproject.com/Questions/560276/DataGridplusKeepplus-SelectedplusItemplusinplusthep, Published on: Mar. 11, 2013, 4 pages.

"Working with Cards on Kanban Board", http://help.swiftkanban.com/getting-started/projects/kanban-board/working-with-cards.html, Published on: 2009, 27 pages.

"How to Use the Mini Toolbar and Contextual Menu in Microsoft Excel 2016", http://www.simonsezit.com/article/how-to-use-the-mini-toolbar-and-contextual-menu-in-microsoft-excel-2016/, Published on: 2008, 3 pages.

"International Search Report and Written Opinion Issued in PCT Application No. PCT/US2018/026149", dated Jul. 18, 2018, 10 Pages.

* cited by examiner

CONTINUED SELECTION DURING SCROLLING PAST SCREEN EDGE THRESHOLDS

FIELD

This application relates generally to the field of machine operation. More specifically, the present invention relates to retaining selected items while scrolling.

BACKGROUND

Devices with a touch user interface typically have a limited number of gestures that can be used to interact with a device. Often, the touch gestures are limited to a press or touch, a long press/touch, a swipe and press while swiping. This limited number of gestures are usually put together to allow users to interact with the touch device and/or applications on the device.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments of the present disclosure target the problems that occur when a user selects an item in a list and then scrolls the list. In prior art device behavior, when an item from a list is selected and the list scrolled, the selected item scrolls off the device display. This results in display of a list without selected items. Additionally, the context of operations change when the selected item leaves the display device.

In representative embodiments, when a user selects an item in a list, the selection establishes a context. For example, when a user selects an item in a list, the context may allow for display of additional controls that would allow a user to perform actions relative to the selected item (edit, delete, and so forth). As the list is scrolled, a comparison is made to the position of the selected item and the edge of the viewable area. When the selected item is within a threshold distance of the edge of the viewable area, the system identifies another item that is outside of the threshold distance of the viewable area and transfers the selection to that item, deselecting the previous item. The context remains the context of a selected item, although the details of that context, such as what UI elements (controls, dialogs, etc.) are displayed and other aspects such as the size of the selected item, etc. may change as a result of the transfer of selection.

DESCRIPTION

Figure 1:
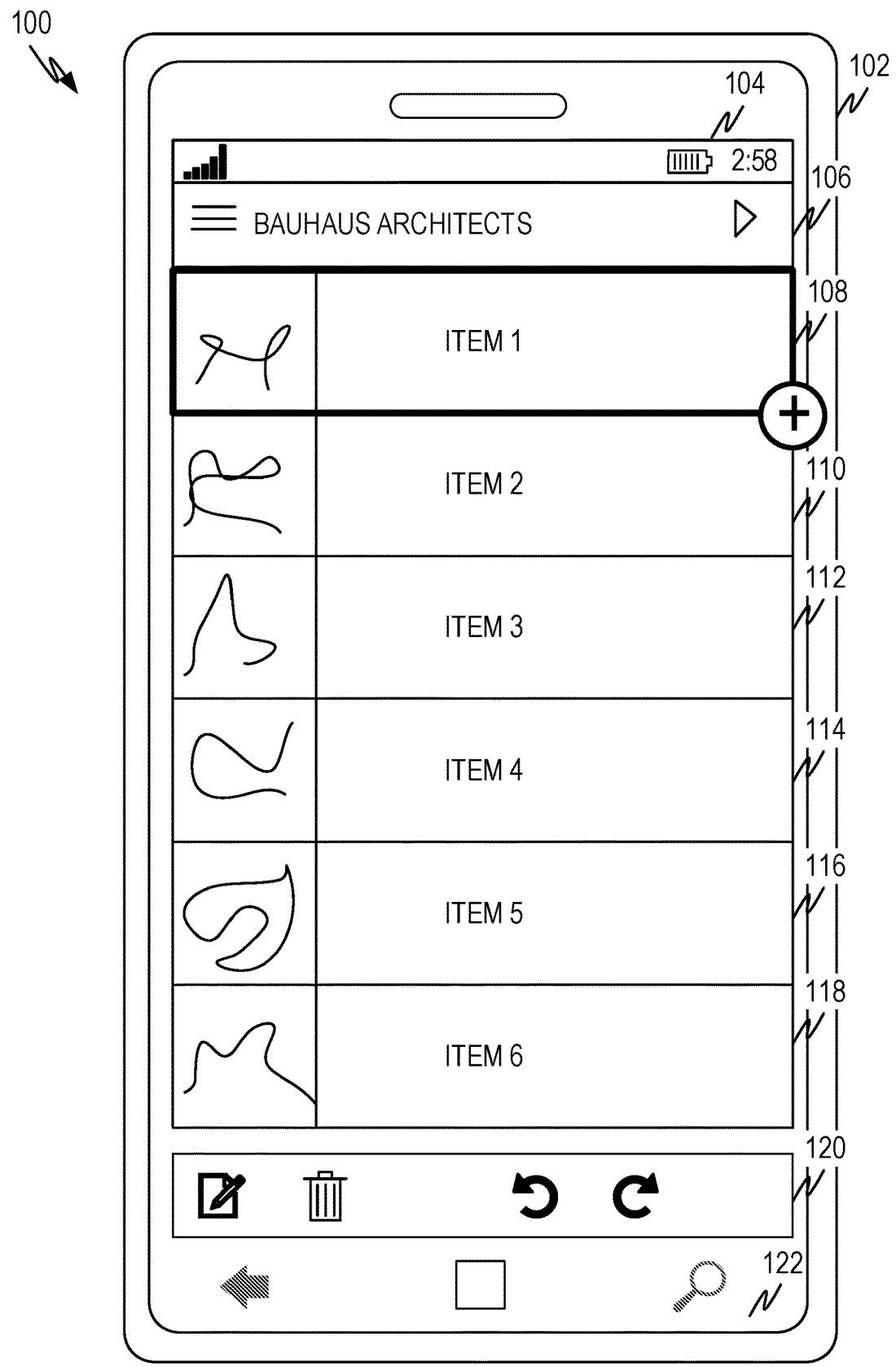
FIG. 1 illustrates prior art device behavior when scrolling.

FIG. 1 illustrates prior art device behavior 100 when scrolling. The device 102 shown is a mobile device with a touch screen where uses can indicate selections and other gestures through touch. The device 102 comprises one area 104 where status information such as signal strength, battery status, time and other such information can be displayed. The device 102 also comprises another area 122 where other permanent controls such as an action button, search button, arrow button and so forth can be located. The remainder of the display area can comprise one or more viewports where information is displayed. In the representative example, the display comprises a top viewport 106, a viewport comprising a list of items 108, 110, 112, 114, 116, and 118, and a viewport 120 where context controls can be displayed. In this disclosure the term viewport is all or a portion of a display where information, items, controls, and so forth are displayed. In this example, the top viewport 106 remains constant, the middle viewport comprising the list of items (108-118) allows the list of items to be scrolled up and down and the bottom viewport 120 comprises controls that change with the current context. The term context is used to represent a state of program operation. Thus, when an item 108 is selected, the bottom viewport 120 can display user accessible controls that allow the user to perform operations on or access functions related to the state "item selected," which in this example may include operations/functions related to the selected item 108, such as editing the item, deleting the item, forwarding the item, reverting to a prior version of the item, and so forth.

Figure 2:
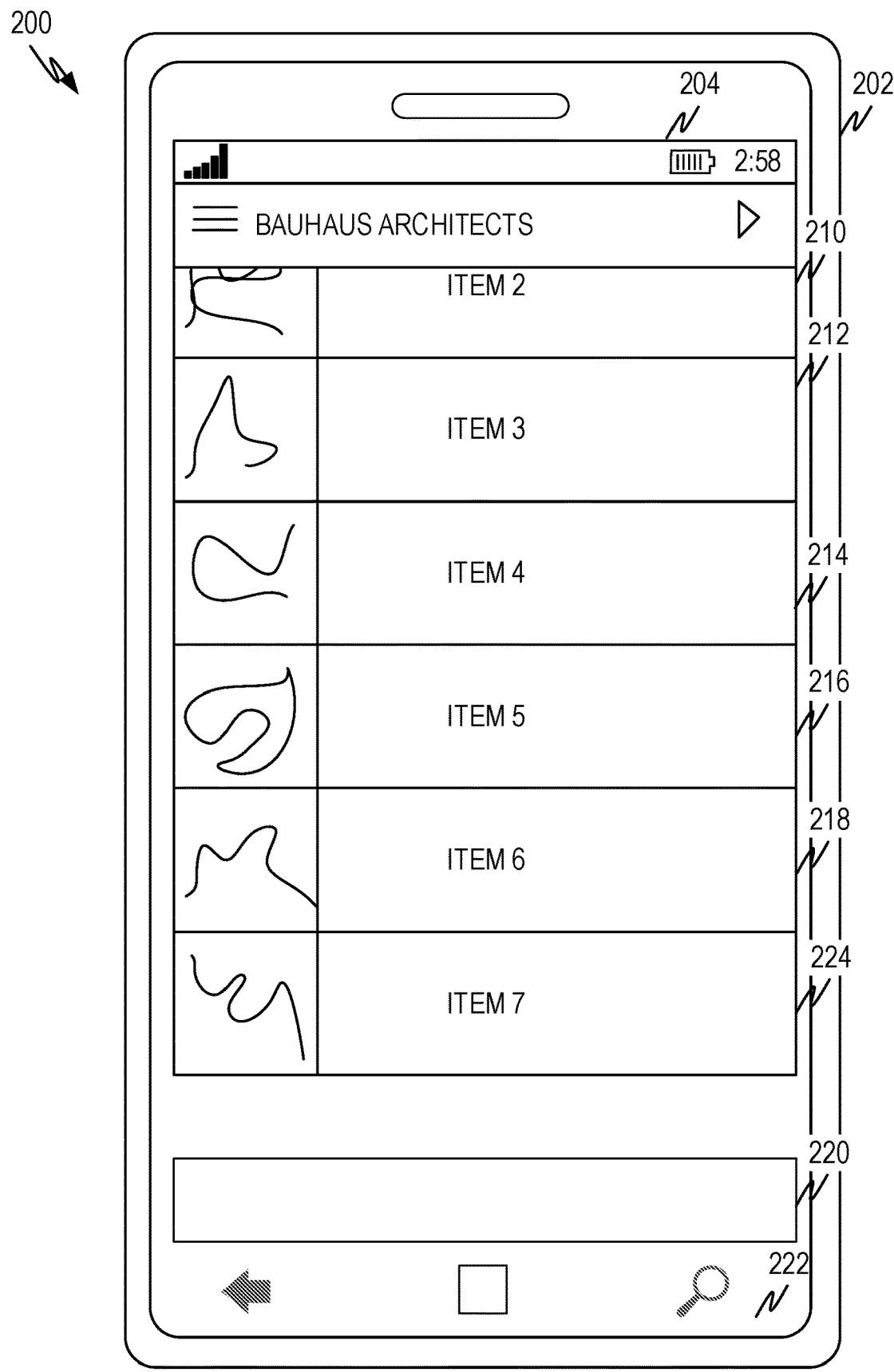
FIG. 2 illustrates prior art device behavior when scrolling.

FIG. 2 illustrates prior art device behavior 200 when scrolling. FIG. 2 represents what happens in a prior art device when a selected item scrolls off the screen. The device 202 comprises the same three viewports. A top viewport 204 where status and other information can be displayed, a middle viewport comprising the list of scrollable items (210, 212, 214, 216, 218, 224) and a bottom viewport 220 where a list of context sensitive controls can be displayed. The device 202 also comprises an area 222 where permanent controls can reside.

In this figure, the selected item (e.g., item 108 from FIG. 1) has scrolled outside the viewport so that the selected item cannot be seen. When this happens, the bottom viewport 220 where context controls related to the selected item can be displayed either goes blank, disappears altogether, or displays new controls related to the "item not selected" context. This is because there is nothing "selected" and the system reverts to the state where an item is not selected.

If a user wishes to select another item, the user must again touch or otherwise indicate the item to be selected. In that situation, the context can return to the "item selected"

context and behave accordingly. Thus, in the prior art device operation, the context is continually changing depending on selection, scrolling and so forth.

Figure 3:
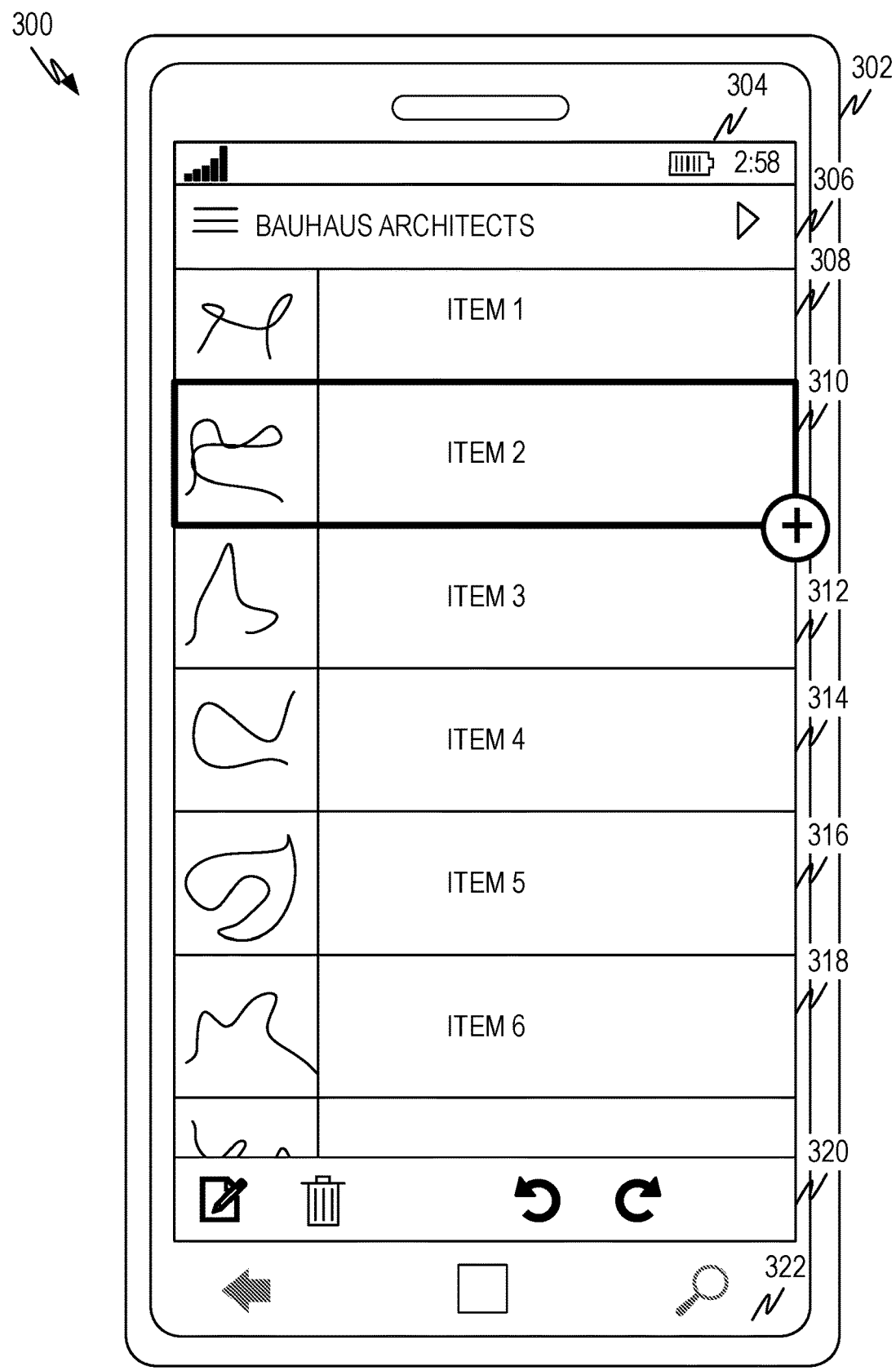
FIG. 3 illustrates an example of device behavior when scrolling according to aspects of the present disclosure.

FIG. 3 illustrates an example of device behavior 300 when scrolling according to aspects of the present disclosure. The device 302 is depicted as a mobile device, however, the present disclosure will work with any device that has a viewport that displays a scrollable list of items, such as an appliance or other special purpose device, a tablet, laptop, desktop, etc. However, the displays of such other devices may not be exactly as depicted in this figure. Such differences are not relevant to the disclosure and all that is needed is a viewport that displays a scrollable list of items.

The device 302 in the figure comprises an area 304 where status information such as signal strength, battery status, time and other such information can be displayed. The device 302 also comprises another area 322 where other permanent controls such as an action button, search button, arrow button and so forth can be located. The remainder of the display area can comprise one or more viewports where information is displayed. In the representative example, the display comprises a top viewport 306, a list viewport comprising a list of items 308, 310, 312, 314, 316, and 318, and a control viewport 320 where context controls can be displayed. In this example, the top viewport 306 remains constant, the middle viewport comprising the list of items (308-318) allows the list of items to be scrolled up and down and the bottom viewport 320 comprises controls that change with the current context.

The list of items (308-318) comprise multiple different types of information such as a figure/graphic and an area for text, although lists in this disclosure can be any type of item with a single or multiple content/information type(s). Furthermore, although the list in this example scrolls up and down, lists that scroll horizontally or both horizontal and vertical (such as a grid, spreadsheet, table, etc.) would also be suitable for use by the disclosed embodiments. Upon selecting an item, context viewport 320 displays controls to access functionality related to the "item selected" context of the application. As representative examples, such controls can enable a user to perform actions like edit an item, delete an item, forward an item, reorder the item, select an item relative to the selected item (select previous item, next item, etc.) or any other type of actions the application exposes when an item is selected.

In the example of FIG. 3, item 2 (310) has been selected by a user and has a visual indication of the selection. Upon selection of item 2 (310), the control viewport 320 displays the appropriate controls as discussed.

Figure 4:
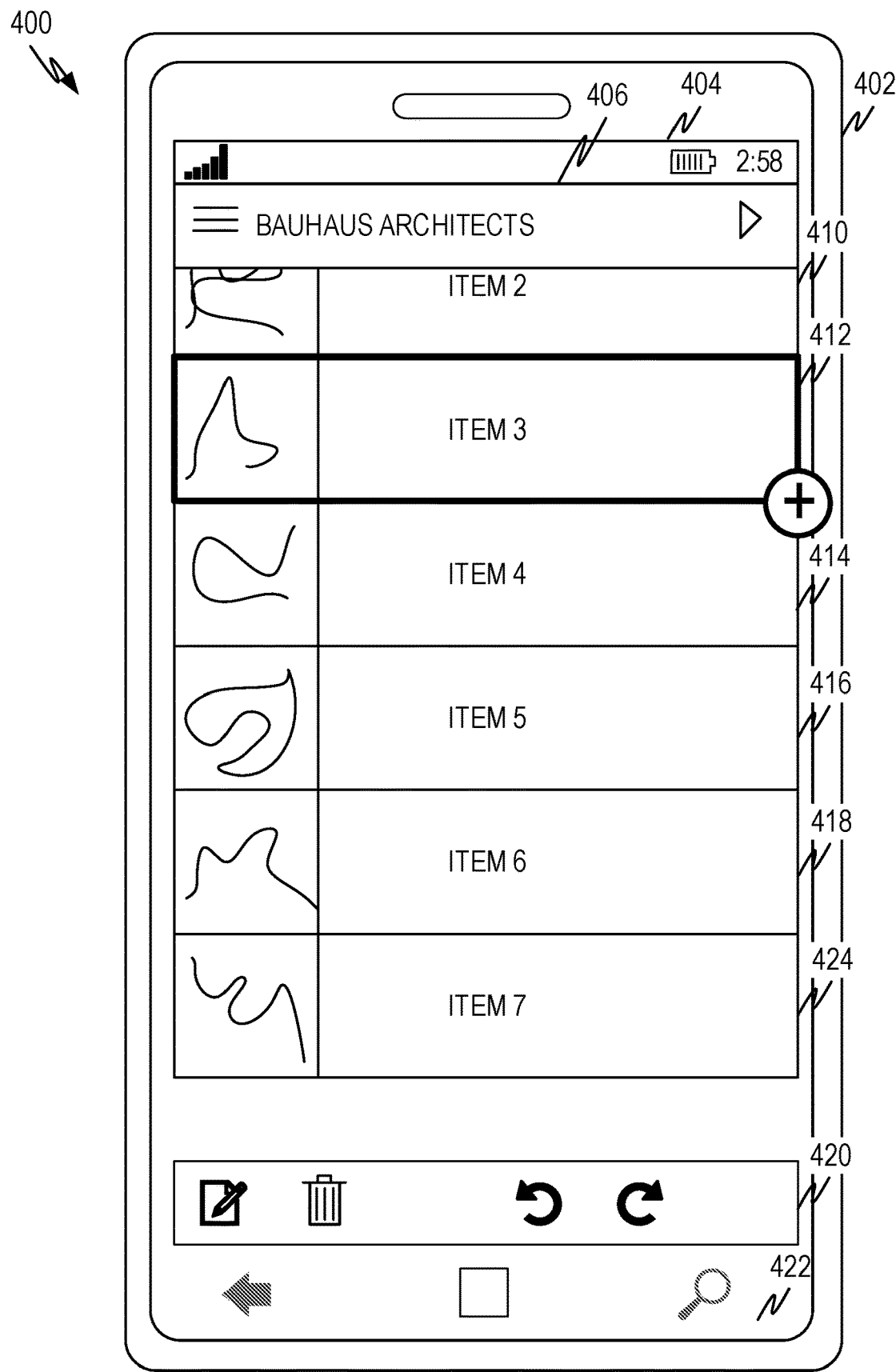
FIG. 4 illustrates an example of device behavior when scrolling according to aspects of the present disclosure.

FIG. 4 illustrates an example of device behavior 400 when scrolling according to aspects of the present disclosure. Specifically, FIG. 4 shows what happens when the selected item scrolls. Thus, the example of FIG. 4 comprises a device 402, a status area 404, a top viewport 406, a list viewport with the list of items (410-418 and 424), a control viewport 420 and an area for permanent controls 422.

Returning for a moment to FIG. 3, item 2 (310) is selected. If a user begins scrolling the list (items 308-318) upward toward the top of the viewport, item 1 (308) would scroll off the viewport and item 2 (310) would begin to approach the top of the viewport. When item 2 (310) is within a threshold distance from the top of the viewport, the system would switch the selection from item 2 (310) to another item within the viewport.

Switching back to FIG. 4, item 2 (410) has begun to scroll off the viewport and the system has switched the selection from item 2 (410) to item 3 (412), which is still in the viewport. When the system switched the selection from item 2 (410) to item 3 (412), the context remains one of an item selected, since the selection was switched from item 2 (410) to item 3 (412). Thus, the display can present whatever UI elements are associated with the item 3 (412) selected context. For example, the control viewport 420 can remain on screen and can remain populated with the controls associated with the "item selected" context. The controls displayed in the control viewport 420 can change if item 3 (412) is of a different type than item 2 (410). For example, if item 3 (412) is a graphic only and item 2 (410) is text only, the controls to interact with the graphic of item 3 (412) may be different than the controls of item 2 (410). Additionally, or alternatively, different and/or changed user interface elements can be presented such as dialog or other callout that displays additional information, a change in size that can display more information, and so forth. On the other hand, if item 3 (412) is the same type as item 2 (410), nothing may change as the selection is switched from item 2 (410) to item 3 (412). This reduces the input required interact with selected items. In the prior art, as the selected item scrolls off the viewport, the context changes and the user has to select a new item and perform whatever else is needed to set the context to the "item selected" context. In the example embodiments, the selected item context is maintained without any need to perform the actions needed to re-establish a selected item context. This quickly exposes commands in the contextual toolbar (e.g., control viewport 420) which relate to grouped objects. This is particularly useful for lists with items that have multiple content types which may have different controls to interact with the individual content types. Thus, the result is a much-simplified mechanism for interacting with the device 402.

Figure 5:
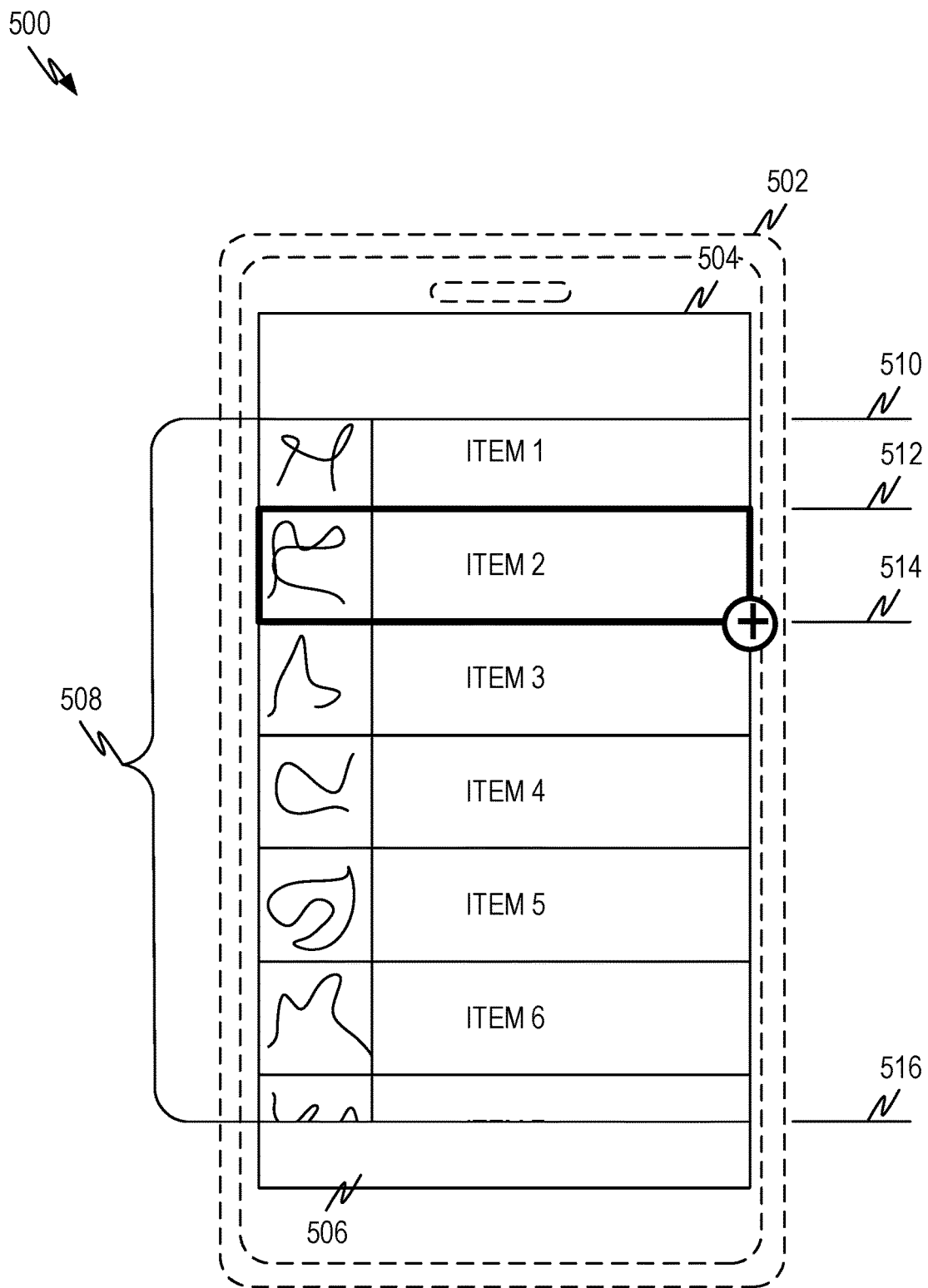
FIG. 5 illustrates an example of determining a threshold distance from the edge of a viewable area.

FIG. 5 illustrates an example 500 of determining a threshold distance from the edge of a viewable area (e.g., a viewport). In this example 500, a device 502 comprises a screen that may have one or more viewports. For example, the screen comprises three viewports 504, 508 and 506. However, the screen may have fewer or more viewports, depending on the application. In this example, the central viewport 508 comprises a list of items that can be scrolled.

The location of the top of the viewport 508 is indicated by a line 510. The bottom of the viewport 508 is indicated by a line 516. Items typically have width and height. Since the list scrolls vertically (e.g., up and down), the height of the items are of interest when deciding whether an item is within a threshold distance from the edge of the viewport. For example, the top of item 2 is represented by a line 512 and the bottom of item 2 is represented by a line 514.

When determining whether item 2 is within a threshold distance of the top of the viewport 510, the system can utilize the top 512 or bottom 514 of the selected item. Which is selected depends on whether the embodiment switches when the top or the bottom of the item is within a threshold distance from the edge. For example, if the threshold distance is calculated using the top of the viewport 510 and the bottom of the item 514, then depending on how far the threshold distance is set, the item may be partially scrolled off the viewport (e.g., such as how item 1 is illustrated in FIG. 5), before the system switches to a different item. Thus, a basic distance can be calculated by:

$$d_i = Vp - I$$

Where: $d_i$ is the calculated distance

Vp is the location of the edge of the viewport (e.g., 510) and

I is the location of the edge of the item (e.g., 512 or 514)

The calculated distance, $d_i$, is then compared to a threshold and the item switched when the distance is within the threshold.

Additionally, or alternatively, whether the item is within the threshold distance can be dependent on the scroll direction. For example, when the scroll direction is up such that the item is scrolling off the top, the calculated distance can be computed using the bottom of the item (i.e., 514) and the top edge of the viewport (i.e., 510). When the scroll direction is down, such that the item is scrolling off the bottom, the calculated distance can be computed using the top of the item (i.e., 512) and the bottom edge of the viewport (i.e., 516). In an alternative example, when the scroll direction is up, the calculated distance is computed using the top of the item (i.e., 512) and the top of the viewport (i.e., 510) and when the scroll direction is down, the calculated distance is computed using toe bottom of the item (i.e., 514) and the bottom of the viewport (i.e., 516).

When the list scrolls horizontally, the calculated distance can operate similarly using the left/right of the viewport and the left/right of the item and the left/right scroll direction. If the list scrolls both horizontally and vertically (and/or at some other angle), similar calculations can be made and the selected item switched when the appropriate edge of the item comes within the appropriate threshold distance of the appropriate edge of the viewport. In the case of diagonal (e.g., an angle other than horizontal or vertical) scrolling, the diagonal motion can be broken down into a horizontal and vertical component and the selection switched when the horizontal and/or vertical component comes within the corresponding threshold distance of the edge of the viewport.

The threshold distances do not all need to be the same in all instances. Thus, the threshold distance from the top of the viewport can be different than the threshold distance from the bottom of the viewport. Similarly, in the case of horizontal scrolling, the left threshold distance can be different than the right threshold distance. In the examples of multi-directional (e.g., horizontal and vertical or diagonal) scrolling, the horizontal and/or vertical threshold distances can be different as well as the top/bottom and left/right differences described in the case of vertical and horizontal scrolling. This means that all threshold distances (top, bottom, left, right) can all be different if desired.

When identifying which item to switch the selection to, the system can take into account scrolling direction and/or scrolling speed. The newly selected item should be within the viewport. Thus, when the list is scrolled up, the newly selected item is below the currently selected item. When the list is scrolled down, the newly selected item is above the currently selected item. Similar selection is performed for left/right scrolling directions. When the scroll is both horizontal/vertical and/or diagonal (which breaks down into a horizontal and vertical component), the selected item can be away from the direction of scroll. Thus, in the case of diagonal scrolling, the selected item could be on the diagonal away from the direction of scroll. Alternatively, the selected item could be on the vertical or horizontal away from the direction of scroll.

If the list is being scrolled at a fast speed, selecting the next item in the list (i.e., away from the direction of scroll) may result in the selected item scrolling off the viewport before the selected item can be displayed as selected (i.e., the visual indication of selection moved to the newly selected item). Thus, the system can take into account the speed of scrolling. When the speed of scrolling is fast enough that the selected item is within the threshold distance by the time the visual indicator of selection is displayed, the system can select an item that is far enough away from the previously selected item that the user will be cognizant of the new selection before the new selection also is within the threshold distance. In other words, the newly selected item may not necessarily be the next item in the list in all instances.

Figure 6:
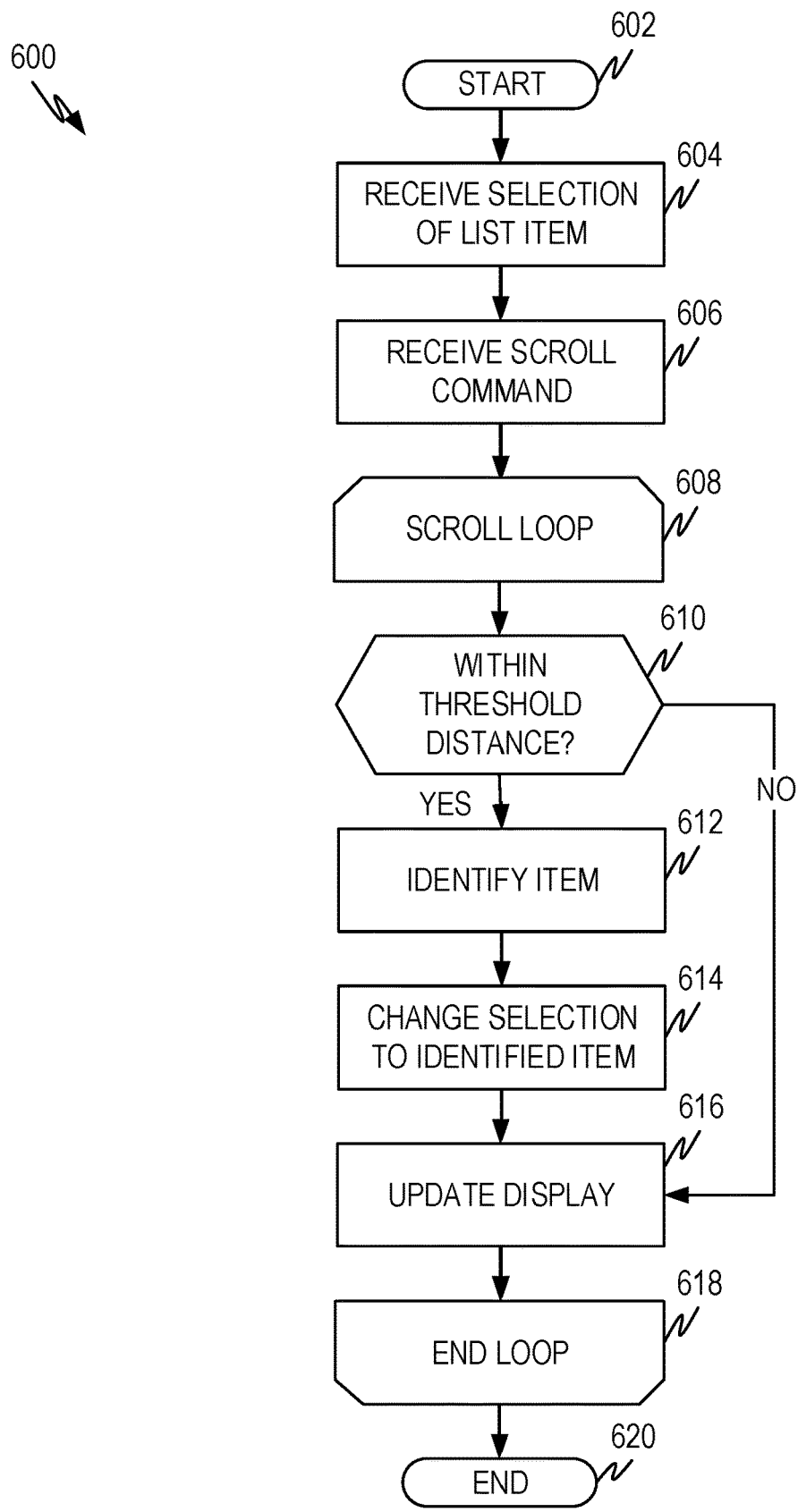
FIG. 6 illustrates a representative flow diagram describing operation of a representative device when scrolling.

FIG. 6 illustrates a representative flow diagram 600 describing operation of a representative device when scrolling. The method starts at operation 602 and proceeds to operation 604 where the system receives selection of an item on a list of items.

When a scroll command is received by the system (operation 606), the system begins monitoring where the selected items is relative to the edges of the viewports. Thus, the operations within the scroll loop 608/618 (i.e., operations 610, 612, 614 and 616) are performed when the list of items is being scrolled.

Operation 610 tests to see whether the currently selected item is within the threshold distance to an edge of the viewport. This can be performed as described above in conjunction with FIG. 5. When the item is not within the threshold distance, the NO branch is taken and execution proceeds to operation 616 where the display is updated to show the position of the scrolled items.

When the item is within the threshold distance, the YES branch is taken and execution proceeds to operation 612 where a new item is identified. This new item can be the next item in the list away from the direction of scroll or any other item as described in conjunction with FIG. 5 above.

Once the new item is identified, the selection is changed to the new item while maintaining a selected item context (operation 614) as previously described. Updating the selection includes updating the visual selection indicator as described herein. Execution then proceeds to operation 616 where the display is updated to display both the new selection and the new positions of the items in the list.

The scroll loop ends at operation 618. As described, the loop is exited when the list is no longer scrolled. Execution ends at operation 620.

Example Machine Architecture and Machine-Readable Medium

Figure 7:
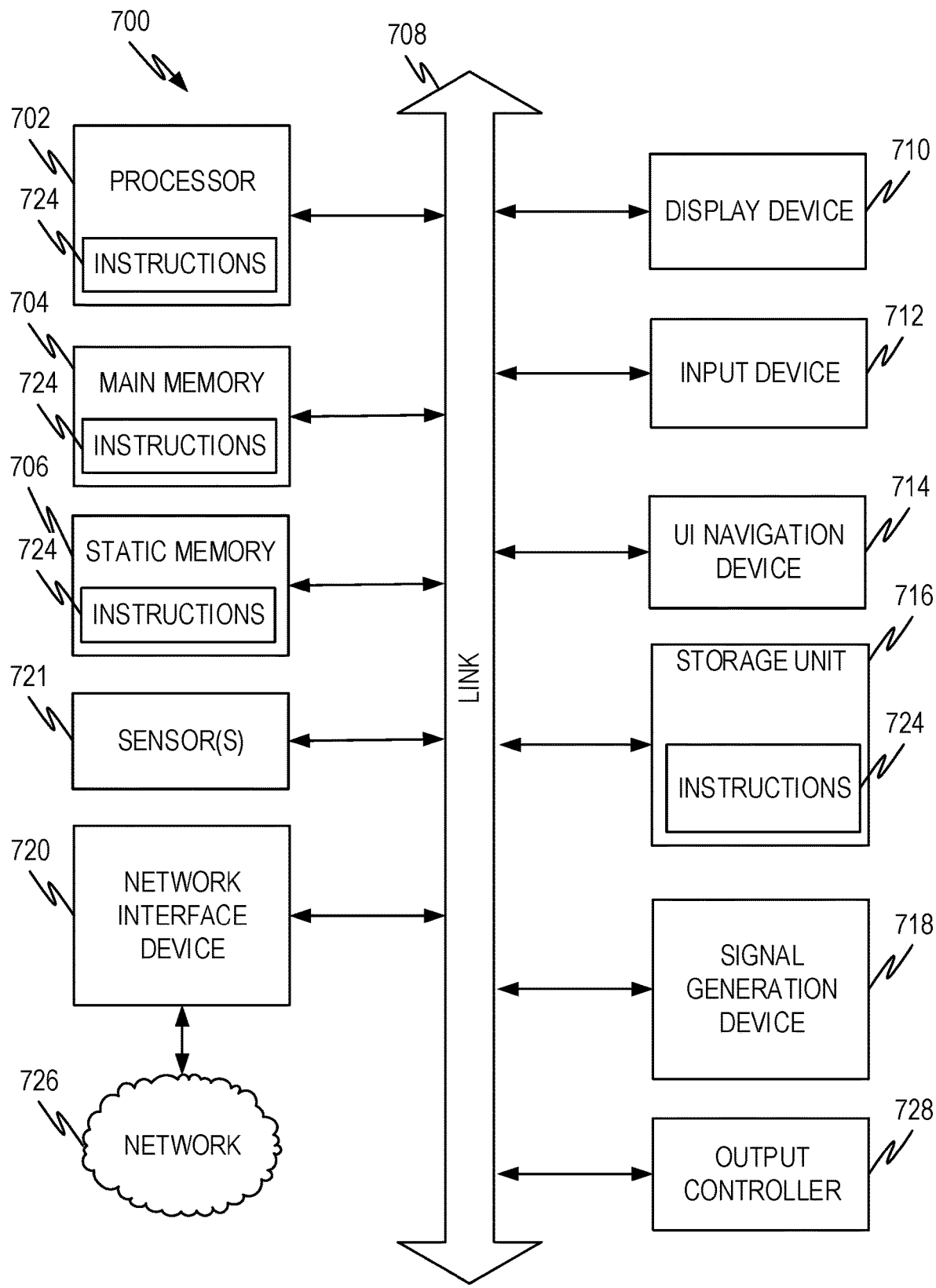
FIG. 7 illustrates a representative machine architecture suitable for implementing the systems and other aspects disclosed herein or for executing the methods disclosed herein.

FIG. 7 illustrates a representative machine architecture suitable for implementing the systems and so forth or for executing the methods disclosed herein. The machine of FIG. 7 is shown as a standalone device, which is suitable for implementation of the concepts above. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 7 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 700 includes at least one processor 702 (e.g., a central processing unit (CPU), system on a chip (SoC), a graphics processing unit (GPU), advanced processing unit (APU), etc., or combinations thereof), one or more memories such as a main memory 704, a static memory 706, or other types of memory, which communicate with each other via link 708. Link 708 may be a bus or other type of connection channel. The machine 700 may include further optional aspects such as a graphics display unit 710 comprising any type of display. The machine 700 may also include other optional aspects such as an alphanumeric input device 712 (e.g., a keyboard, touch screen, and so forth), a user interface (UI) navigation device 714 (e.g., a mouse, trackball, touch device, and so forth), a storage unit 716 (e.g., disk drive or other storage device(s)), a signal generation device 718 (e.g., a speaker), sensor(s) 721 (e.g., global positioning sensor, accelerometer(s), microphone(s), camera(s), and so forth), output controller 728 (e.g., wired or wireless connection to connect and/or communicate with one or more other devices such as a universal serial bus (USB), near field communication (NFC), infrared (IR), serial/parallel bus, etc.), and a network interface device 720 (e.g., wired and/or wireless) to connect to and/or communicate over one or more networks 726.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for maintaining selection while scrolling, comprising:
receiving from a user selection of an item (514) in a list of items (604);

monitoring a position of the item relative to an edge of a viewport (510, 516) while the list of items is scrolled;
responsive to identifying that the position of the item relative to the edge is within a threshold distance from the edge: (610)
identifying a second item outside the threshold distance from the edge; (612)
transferring selection from the item to the second item such that the item becomes deselected and the second item becomes selected. (614)

Example 2

The method of example 1 further comprising:
displaying a visual indication of selection of the second item.

Example 3

The method of example 1 further comprising transferring a visual indication of selection from the item to the second item.

Example 4

The method of example 1, 2, or 3 wherein the edge is one of:
a top edge of the viewport;
a bottom edge of the viewport;
a left edge of the viewport;
a right edge of the viewport.

Example 5

The method of example 1 further comprising maintaining a current context when the selection is transferred from the item to the second item.

Example 6

The method of example 1 wherein the second item is a list item away from a direction of scroll.

Example 7

The method of example 1 wherein the second item is a list item next to the item.

Example 8

The method of example 1 wherein the threshold distance is measured from an item edge closest to the edge.

Example 9

The method of example 1 wherein the threshold distance is measured from an item edge farthest from the edge.

Example 10

A system for completing a question comprising:
a processor and executable instructions accessible on a computer storage medium that, when executed, cause the processor to perform operations comprising:
receiving from a user selection of an item (514) in a list of items; (604)
monitoring a position of the item relative to an edge of a viewport (510, 516) while the list of items is scrolled;

responsive to identifying that the position of the item relative to the edge is within a threshold distance from the edge: (610)

identifying a second item outside the threshold distance from the edge; (612)

transferring selection from the item to the second item such that the item becomes deselected and the second item becomes selected. (614)

Example 11

The system of example 10 further comprising:
displaying a visual indication of selection of the second item.

Example 12

The system of example 10 further comprising transferring a visual indication of selection from the item to the second item.

Example 13

The system of example 10 wherein the edge is one of:
a top edge of the viewport;
a bottom edge of the viewport;
a left edge of the viewport;
a right edge of the viewport.

Example 14

The system of example 10 further comprising maintaining a current context when the selection is transferred from the item to the second item.

Example 15

The system of example 10, 11, 12, 13, 14, or 15 wherein the second item is a list item away from a direction of scroll.

Example 16

The system of example 10 wherein the second item is a list item next to the item.

Example 17

The system of example 10 wherein the threshold distance is measured from an item edge closest to the edge.

Example 18

The system of example 10 wherein the threshold distance is measured from an item edge farthest from the edge.

Example 19

A computer storage medium comprising executable instructions that, when executed by a processor of a machine, cause the machine to perform operations comprising:

receive from a user via a user interface, selection of an item (514) in a list of items; (604)

monitor a position of the item relative to an edge of a viewport (510, 516) while the list of items is scrolled;

responsive to the position of the item relative to the edge being within a threshold distance from the edge: (610)

identify a second item outside the threshold distance from the edge; (612)

transfer selection from the item to the second item such that the item becomes deselected and the second item becomes selected; (614) and display a visual indicator that the second item is now selected. (412, 616)

Example 20

The medium of example 19 further comprising maintaining a current context when the selection is transferred to the second item.

Example 21

A method for maintaining selection while scrolling, comprising:

receiving from a user selection of an item (514) in a list of items (604);

monitoring a position of the item relative to an edge of a viewport (510, 516) while the list of items is scrolled;

responsive to identifying that the position of the item relative to the edge is within a threshold distance from the edge: (610)

identifying a second item outside the threshold distance from the edge; (612)

transferring selection from the item to the second item such that the item becomes deselected and the second item becomes selected. (614)

Example 22

The method of example 21 further comprising:
displaying a visual indication of selection of the second item.

Example 23

The method of example 21 or 22 further comprising transferring a visual indication of selection from the item to the second item.

Example 24

The method of example 21, 22, or 23 wherein the edge is one of:
a top edge of the viewport;
a bottom edge of the viewport;
a left edge of the viewport;
a right edge of the viewport.

Example 25

The method of example 21, 22, 23, or 24 further comprising maintaining a current context when the selection is transferred from the item to the second item.

Example 26

The method of example 25 wherein maintaining the current context further comprises displaying a different context control.

Example 27

The method of example 25 wherein maintaining the current context further comprises changing the user interface to correspond to selection of the second item.

Example 28

The method of example 21, 22, 23, 24, 25, 26, or 27 wherein the second item is a list item away from a direction of scroll.

Example 29

The method of example 21, 22, 23, 24, 25, 26, 27 or 28 wherein the second item is a list item next to the item.

Example 30

The method of example 21, 22, 23, 24, 25, 26, 27, 28, or 29 wherein the threshold distance is measured from an item edge closest to the edge.

Example 31

The method of example 21, 22, 23, 24, 25, 26, 27, 28, or 29 wherein the threshold distance is measured from an item edge farthest from the edge.

Example 32

The method of example 21, 22, 23, 24, 25, 26, 27, 28, 29, 30, or 31 wherein the threshold distance is set such that the selection changes before the item is scrolled off the screen in the direction of scroll.

Example 33

The method of example 21, 22, 23, 24, 25, 26, 27, 28, 29, 30, or 31 wherein the threshold distance is set such that the selection changes when the item is scrolled off the screen in the direction of scroll.

Example 34

An apparatus comprising means to perform a method as in any preceding example.

Example 35

Machine-readable storage including machine-readable instructions, when executed, to implement a method or realize an apparatus in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for maintaining selection while scrolling, comprising:
   receiving from a user selection of an item in a list of items;
   identifying a direction of scroll of the item;
   identifying a viewport through which at least the item is visible, the viewport having a top edge and a bottom edge;
   responsive to the direction of scroll moving the selected item toward the top edge:
      monitoring a position of the item relative to the top edge of the viewport while the item is scrolled;
      responsive to identifying that the position of the item relative to the top edge is within a first threshold distance from the top edge:
         identifying a second item outside the threshold distance from the top edge; and
         transferring selection from the item to the second item such that the item becomes deselected and the second item becomes selected; and
   responsive to the direction of scroll moving the selected item toward the bottom edge:
      monitoring a position of the item relative to the bottom edge of the viewport while the selected item is scrolled;
      responsive to identifying that the position of the item relative to the bottom edge is within a second threshold distance from the bottom edge:
         identifying a second item outside the threshold distance from the bottom edge; and
         transferring selection from the item to the second item such that the item becomes deselected and the second item becomes selected;
   wherein the first threshold distance and second threshold distance is measured from an item edge closest to or farthest from the viewport edge the item is moving toward.

2. The method of claim 1 further comprising:
   displaying a visual indication of selection of the second item.

3. The method of claim 1 further comprising transferring a visual indication of selection from the item to the second item.

4. The method of claim 1 wherein the viewport further comprises a left edge and a right edge and wherein the method further comprises:
   responsive to the direction of scroll moving the selected item toward the left edge:
      monitoring a position of the item relative to the left edge of the viewport while the selected item is scrolled;
      responsive to identifying that the position of the item relative to the left edge is within a third threshold distance from the left edge:
         identifying a second item outside the threshold distance from the left edge; and
         transferring selection from the item to the second item such that the item becomes deselected and the second item becomes selected; and
   responsive to the direction of scroll moving the selected item toward the right edge:
      monitoring a position of the item relative to the right edge of the viewport while the selected item is scrolled;
      responsive to identifying that the position of the item relative to the right edge is within a fourth threshold distance from the right edge:
         identifying a second item outside the threshold distance from the right edge; and transferring selection from the item to the second item such that the item becomes deselected and the second item becomes selected.

5. The method of claim 1 further comprising maintaining a current context when the selection is transferred from the item to the second item.

6. The method of claim 1 wherein the second item is a list item away from a direction of scroll.

7. The method of claim 1 wherein the second item is a list item next to the item.

8. The method of claim 1 wherein the threshold distance is measured from the item edge closest to a viewport edge that the item is moving towards.

9. The method of claim 1 wherein the threshold distance is measured from the item edge farthest from a viewport edge that the item is moving towards.

10. A system for completing a question comprising: a processor and executable instructions accessible on a computer storage medium that, when executed, cause the processor to perform operations comprising:
receiving from a user selection of an item in a list of items;
identifying a direction of scroll of the item;
identifying a viewport through which at least the item is visible, the viewport having a top edge and a bottom edge;
responsive to the direction of scroll moving the selected item toward the top edge:
monitoring a position of the item relative to the top edge of the viewport while the item is scrolled;
responsive to identifying that the position of the item relative to the top edge is within a first threshold distance from the top edge:
identifying a second item outside the threshold distance from the top edge; and
transferring selection from the item to the second item such that the item becomes deselected and the second item becomes selected; and
responsive to the direction of scroll moving the selected item toward the bottom edge:
monitoring a position of the item relative to the bottom edge of the viewport while the selected item is scrolled;
responsive to identifying that the position of the item relative to the bottom edge is within a second threshold distance from the bottom edge:
identifying a second item outside the threshold distance from the bottom edge; and
transferring selection from the item to the second item such that the item becomes deselected and the second item becomes selected;
wherein the first threshold distance and second threshold distance is measured from an item edge closest to or farthest from the viewport edge the item is moving toward.

11. The system of claim 10 further comprising:
displaying a visual indication of selection of the second item.

12. The system of claim 10 further comprising transferring a visual indication of selection from the item to the second item.

13. The system of claim 10 wherein the viewport further comprises a left edge and a right edge and wherein the operations further comprise:
responsive to the direction of scroll moving the selected item toward the left edge:
monitoring a position of the item relative to the left edge of the viewport while the selected item is scrolled;
responsive to identifying that the position of the item relative to the left edge is within a third threshold distance from the left edge:
identifying a second item outside the threshold distance from the left edge; and
transferring selection from the item to the second item such that the item becomes deselected and the second item becomes selected; and
responsive to the direction of scroll moving the selected item toward the right edge:
monitoring a position of the item relative to the right edge of the viewport while the selected item is scrolled;
responsive to identifying that the position of the item relative to the right edge is within a fourth threshold distance from the right edge:
identifying a second item outside the threshold distance from the right edge; and
transferring selection from the item to the second item such that the item becomes deselected and the second item becomes selected.

14. The system of claim 10 further comprising maintaining a current context when the selection is transferred from the item to the second item.

15. The system of claim 10 wherein the second item is a list item away from a direction of scroll.

16. The system of claim 10 wherein the second item is a list item next to the item.

17. The system of claim 10 wherein the threshold distance is measured from the item edge closest to a viewport edge that the item is moving towards.

18. The system of claim 10 wherein the threshold distance is measured from the item edge farthest from a viewport edge that the item is moving towards.

19. A computer storage medium comprising executable instructions that, when executed by a processor of a machine, cause the machine to perform operations comprising:
receive from a user via a user interface, selection of an item in a list of items;
identifying a direction of scroll of the item;
identifying a viewport through which at least the item is visible, the viewport having a top edge and a bottom edge;
responsive to the direction of scroll moving the selected item toward the top edge:
monitoring a position of the item relative to the top edge of the viewport while the item is scrolled;
responsive to identifying that the position of the item relative to the top edge is within a first threshold distance from the top edge:
identifying a second item outside the threshold distance from the top edge;
transfer selection from the item to the second item such that the item becomes deselected and the second item becomes selected; and
display a visual indicator that the second item is now selected; and
responsive to the direction of scroll moving the selected item toward the bottom edge:
monitoring a position of the item relative to the bottom edge of the viewport while the selected item is scrolled;

responsive to identifying that the position of the item relative to the bottom edge is within a second threshold distance from the bottom edge:
identifying a second item outside the threshold distance from the bottom edge; and
transferring selection from the item to the second item such that the item becomes deselected and the second item becomes selected; and
display the visual indicator that the second item becomes selected; and
wherein the first threshold distance and second threshold distance is measured from an item edge closest to or farthest from the viewport edge the item is moving toward.

20. The medium of claim 19 further comprising maintaining a current context when the selection is transferred to the second item.

* * * * *